United States Patent Office 3,452,095
Patented June 24, 1969

3,452,095
5 - (3' - AMINOPROPYL) - 5 - HYDROXY - 5,6,11,12-TETRAHYDRODIBENZO[a,e]CYCLOOCTENES AND SALTS THEREOF
Kurt Adank Muttenz, Basel-Land, and Daniel A. Prins, Oberwil, Basel-Land, Switzerland, assignors to Geigy Chemical Corporation, Greenburgh, N.Y., a corporation of Delaware
No Drawing. Original application Sept. 9, 1963, Ser. No. 307,290, now Patent No. 3,389,117, dated June 18, 1968. Divided and this application Sept. 22, 1967, Ser. No. 681,944
Claims priority, application Switzerland, Sept. 14, 1962, 10,947/62
Int. Cl. C07c 87/28; C07d 87/00; A61k 27/00
U.S. Cl. 260—570.8                             2 Claims

ABSTRACT OF THE DISCLOSURE

The compounds are of the class of 5-(3'-aminopropyl)-5-hydroxy - 5,6,11,12 - tetrahydrodibenzo[a,e]cyclooctenes and salts thereof and are useful as spasmolytic agents. An illustrative example is 5-(3'-dimethylaminopropyl)-5-hydroxy - 5,6,11,12 - tetrahydro-dibenzo[a,e]cyclooctene.

CROSS-REFERENCE TO RELATED CASE

This application is a division of application Ser. No. 307,290, filed Sept. 9, 1963 and now U.S. Patent No. 3,389,177.

DETAILED DESCRIPTION

The present invention relates to new amines which have valuable pharmacological properties, as well as to a process for producing the new amines.

It has surprisingly been found that derivatives of dibenzo-[a,e]cyclooctene, corresponding to the Formula I

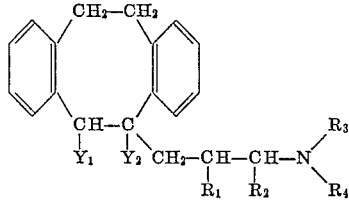

wherein
$Y_1$ represents hydrogen, and
$Y_2$ the hydroxyl group, or
$Y_1$ and $Y_2$ together an additional bond,
$R_1$, $R_2$ and $R_3$ represent independently of each other hydrogen or a lower alkyl radical, and
$R_4$ represents a lower alkyl radical, and wherein $R_2$ and $R_4$ can be bound together to form a lower alkylene radical having at least 3 chain members, and wherein a lower alkyl radical $R_3$ can be bound to $R_4$ directly or by way of an oxygen atom, as well as its salts with inorganic or organic acids have valuable pharmacological properties. These products relax the contractions of the smooth musculature and show an activity superior to that of papaverine as was confirmed by the results of the following tests.

As a measure for the relaxing activity on smooth muscle the so-called papaverine value was used. This value represents the amount of test substance in milligrams (mg.) which causes the same muscle-relaxing, i.e. contraction-decontracting or lytic effect as 1 mg. of papaverine, when added under standard conditions to a segment of guinea-pig ileum in tyrode solution, which segment had been previously caused to contract by addition of 10 mg. of barium chloride to the tyrode solution.

The values given in the following table were obtained:

| Compound (tested as hydrochlorides) | Relative dose (in mg.) required for obtaining same effect as 1 mg of papaverine | Acute toxicity (mouse I.V.) DL₅₀ (mg./kg.) |
|---|---|---|
| Papaverine | 1 | 28–30 |
| 5-(γ-dimethylaminopropyl)-11,12-dihydrodibenzo[a,e]cyclooctene (prepared according to example 3) | 0.33 | 38 |
| 5-(γ-dimethylamino-β-methylpropyl)-5-hydroxy-5,6,11,12-tetrahydro-dibenzo[a,e]-cyclooctene (prepared analogously to example 1) | 0.41 | 48 |
| 5-(γ-dimethylamino-β-methylpropyl)-11,12-dihydro-dibenzo[a,e]cyclooctene (prepared analogously to example 3) | 0.23 | 42 |

As shown in the above table, the preparations are several times more active and have a leser toxicity than papaverine. The results of the toxicologic test and of the spasmolytic activity show that these products have a better therapeutic effect than papaverine and are thus useful as active ingredients in spasmolytic preparations for mammals. Such preparations contain 15 to 150 mg. of the active substance in dosage unit form.

Similar properties are shown by compounds of the formulas

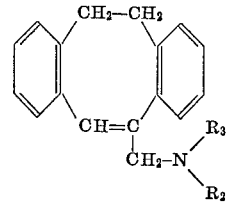

IA and

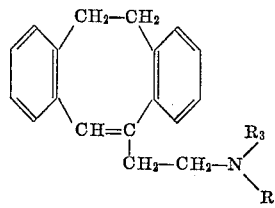

IB which are, therefore, also useful as papaverine-type spasmolytics.

$R_3$ and $R_4$ in the above Formulas IA and IB have the same meanings as in Formula I.

The term "lower" when used in this specification and in the appended claims in connection with an aliphatic radical means that such radical has from 1 to not more than 4 carbon atoms, unless specifically stated otherwise.

A process for the production of the compounds falling under Formula I comprises (a) Reacting in an ethereal solvent 11,12-dihydro-dibenzo[a,e]cycloocten-5(6H)-one of the formula

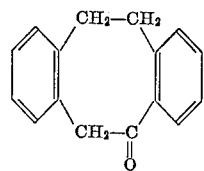

(II)

with a Grignard-type metal-organic compound which contains, as organic component, the radical of the Formula III

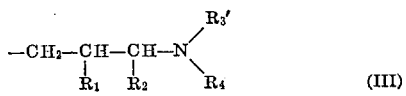

wherein

R₃′ represents a benzyl radical or a lower alkyl radical which alkyl radical can be bound to R₄ either directly or by way of an oxygen bridge, and R₁, R₂, and R₄ have the meanings given above, in particular with a corresponding magnesium halide;

(b) Hydrolysing the resulting reaction product to form the compound of the Formula IV

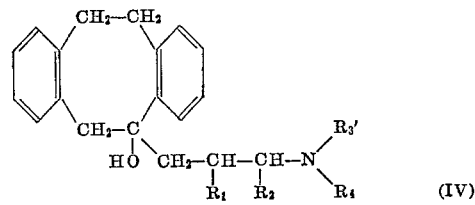

wherein R₁, R₂, R₃′ and R₄ have the aforesaid meanings and which possess in 5-position a free hydroxyl group;

(c) Splitting off benzyl when R₃′ is a benzyl radical by hydrogenolysis;

(d) If desired, subjecting a compound obtained in this way or by the previous step (b) to conditions which split off water; and (e) If desired, converting the resulting compound falling under Formula I into a salt with an inorganic or organic acid.

By metal-organic compounds having the radical of the general Formula III as organic component are meant in particular magnesium organic, lithium organic and zinc organic compounds. Preferably the organic magnesium halides are used which are produced in diethyl either, tetrahydrofuran or another ether-like solvent in the known manner whether it be, for example, by corroding magnesium filings with a reactive halide or by using Gilman alloy.

Suitable metal organic compounds having a radical of the general Formula III are the organic magnesium halides obtained from, for example, γ-dimethylamino-propyl chloride,
γ-(N-benzyl-methylamino)-propyl chloride,
γ-diethylamino-propyl chloride,
γ-pyrrolidinyl-(1)-propyl chloride,
γ-piperidino-propyl chloride,
γ-hexa-methyleneimino-propyl chloride,
γ-morpholino-propyl chloride,
γ-di-methylamino-butyl chloride,
γ-dimethylamino-β-methyl-propyl chloride,
γ-(N-benzyl-methylamino)-β-methyl-propyl chloride,
γ-piperidino-β-methyl-propyl chloride,
1-methyl-pyrrolidinyl-(2)-ethyl chloride,
1-methyl-piperidyl-(2)-ethyl chloride,
1-benzyl-piperidyl-(2)-ethyl chloride,
1-methyl-pyrrolidinyl-(3)-methyl chloride, as well as from the corresponding bromides.

The production of 11,12-dihydro-dibenzo[a,e]cycloocten-5(6H)-one(5,6,11,12-tetrahydro-dibenzo[a,e]cycloocten-5-one) has been described by A. C. Cope and R. D. Smith, J. Am. Chem. Soc. 77, 4596 (1955) and N. J. Leonard et al., J. Am. Chem. Soc. 77, 5078 (1955). This starting material is added in finely pulverized form, dispersed in the same solvent which is used for the formation of the metal organic compound or in another inert solvent such as benzene, to the solution containing said metal-organic compound, and the reaction is performed preferable at room temperature or at moderately raised temperature. The metal compounds of tertiary hydroxyl compounds formed in the reaction are then directly hydrolysed in the reaction mixture, for instance by adding ice cold aqueous ammonium chloride solution thereto, and the resulting free compounds of Formula IV are separated, e.g. by extracting them with conventional inert solvents which are non-miscible with water such as diethyl ether, benzene, ethyl acetate or chloroform.

By extracting the resulting organic solutions with aqueous organic or inorganic acids, the desired reaction products are separated from starting material still present as well as from non-basic by-products the presence of which is due, for example, to the activation of the metal with lower alkyl iodides or bromides.

In those cases where a benzyl radical is present as substituent R₃′ in compounds of Formula IV produced in the above manner with metal-organic compounds containing the corresponding radical of Formula III, it is hydrogenolytically split off, for example, by treatment with hydrogen in the presence of Raney nickel or of noble metal catalysts in a suitable inert organic solvent such as, e.g. dioxan or ethanol, if necessary under pressure and/or at a raised temperature.

The compounds of the formula

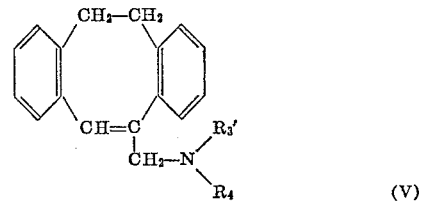

wherein R₃′ and R₄ have the meaning given above, are produced by (a) Reacting 11,12 - dihydro - dibenzo[a,e]cycloocten-5(6H)-one (Formula II) with paraformaldehyde and a secondary amine formula

wherein R₃′ and R₄ have the meanings given hereinbefore, in glacial acetic acid at boiling temperature for several hours.

(b) Reducing the resulting ketone of the formula

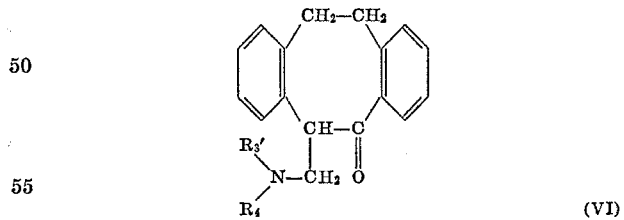

with alkali metal boron hydride, for instance NaBH₄, in a lower alkanol-water mixture, preferably methanol/water (weight ratio 1:1) at room temperature or slightly higher (20°–45° C.), and (c) Splitting off water from the resulting intermediate of the formula

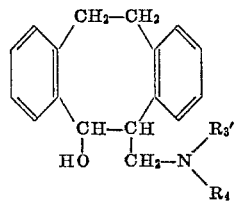

by boiling with a mixture of glacial acetic acid and concentrated hydrochloric acid (preferably in a weight ratio 4:1) for several hours.

The compound of the formula

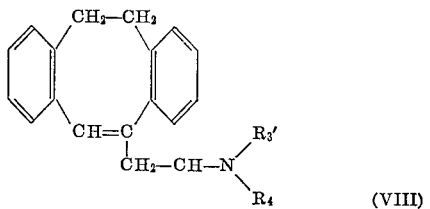

wherein $R_3'$ and $R_4$ have the above meanings, are produced by (a) Reacting the ketone of Formula II with lower alkyl bromozinc-acetate, e.g. ($BZnCH_2COOC_2H_5$) in a mixture of benzene and diethyl ether, preferably in a weight ratio of 1:1, (b) Saponifying the resulting ester of the formula

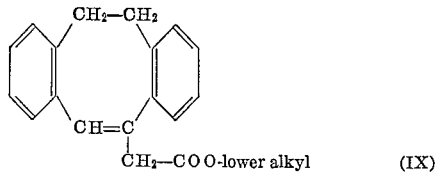

by boiling with ethanolic sodium hydroxide solution, (c) Reacting the resulting free acid, or the unsaponified ester obtained by step (a) directly, with a secondary amine of the formula

wherein $R_3'$ and $R_4$ have the meaning given hereinbefore, at elevated temperature, preferably 120 to 200° C., if required in a closed vessel, and in a nitrogen atmosphere, and (d) Reducing the resulting amide of the formula

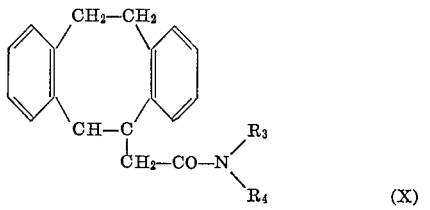

with lithium aluminum hydride or similar amide-reducing hydrides at slightly elevated temperatures (preferably 40–90° C.) in ether-type solvents such as diethyl ether, tetrahydrofuran or dioxan.

The resulting compounds of Formulas V and VIII are recovered from the reaction mixtures of steps (c) and (d) respectively of the two last-described processes by the conventional extraction procedure described further above.

If it is desirable to split off water as the following reaction step, this can be done in various ways, e.g. by boiling the tertiary hydroxyl compounds in a mixture of hydrochloric acid and acetic acid or in concentrated aqueous/alcoholic hydrochloric acid or by heating with acetic anhydride.

Finally, compounds of the formula

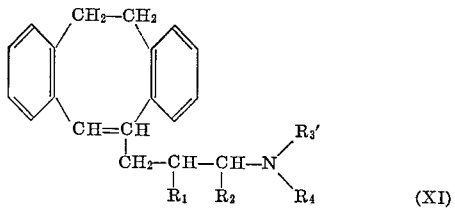

wherein $R_1$, $R_2$, $R_3'$ and $R_4$ have the meanings given above, can be converted in a simple manner into compounds of the general Formula I having a hydrogen atom as $R_3$. This is done by reacting a compound of Formula XI given above with an acid halide which is lower alkyl chloroformate, benzyl chloroformate, or phosgene, or acetyl chloride or benzoyl chloride and hydrolyzing the compound formed, which contains an acyl radical at a nitrogen atom instead of a lower alkyl radical or a benzyl radical, to form a compound having a hydrogen atom as $R_3$.

The reaction with an organic acid halide of the type described above is either performed at room temperature or at elevated temperature in the presence or absence of a suitable organic solvent such as, e.g. benzene, toluene.

Th acid halides can be used in an equimolar amount or in excess and, in the latter case, they can serve as sole reaction medium.

Frequently, on bringing the components together, an exothermic reaction occurs; the radical $R_3'$ is liberated as the corresponding alkyl or benzyl halide and the acyl residue of the acid halide takes its place. The N-acyl compounds are hydrolysed to form compounds of Formula I having a hydrogen atom as $R_3$, for example, by treating with alkali metal hydroxides at a raised temperature in higher boiling solvents containing hydroxyl such as, e.g. ethylene glycol or diethylene glycol or their lower monoalkyl ethers, or in low alkanols in which case the reaction is preferably performed in a closed vessel.

The compounds of Formula IA in which $R_3$ is hydrogen are produced from compound of Formula V in an analogous manner as described for compounds of Formula XI.

The compounds of Formula IB in which $R_3$ is hydrogen are obtained from the corresponding, N,N-disubstituted compounds of Formula VIII by the reaction with an acid halide carried out in the same manner as described in connection with compounds of Formula XI as starting materials.

According to a further aspect of the invention, the compounds of Formulas I, IA, and IB obtained as described above are converted into their salts, using for salt formation preferably those acids whose salts are pharmacologically acceptable in the practical dosages necessary, such as, e.g. the salts formed with hydrochloric acid, hydrobromic acid, sulphuric acid, phosphoric acid, methane sulphonic acid, ethane disulphonic acid, β-hydroxyethane sulphonic acid, acetic acid, propionic acid, lactic acid, succinic acid, fumaric acid, maleic acid, malic acid, tartaric acid, citric acid, benzoic acid, salicylic acid, mandelic acid. For purposes of purification by recrystallisation, however, also salts of those acids can be produced which are not conventionally used in pharmaceuticals, for instance perchlorates and the like.

The following examples further illustrate the production of the new compounds. The temperatures are given therein in degrees centigrade.

EXAMPLE 1

3.5 millilitres (ml.) of ethyl bromide and a few grains of iodine are added to 15 g. of magnesium filings in 250 ml. of anhydrous diethyl ether. Reaction starts after a short time and as soon as it slows down, 73 grams (g.) of γ-dimethylamino-propyl chloride in 200 ml. of anhydrous ether are added drop by drop within 90 minutes. On completion of the exothermic reaction, another 2 to 3 ml. of ethyl bromide are added and the reaction mixture is refluxed for 2 hours during which time the magnesium filings dissolved almost completely.

44 g. of 11,12-dihydro-dibenzo[a,e]cycloocten-5(6H)-one in 700 ml. of anhydrous ether are then added drop by drop to the boiling solution and the whole is refluxed for 6 hours. After cooling, it is poured onto a mixture of ice and saturated ammonium chloride solution. The ether phase is separated and the aqueous phase is extracted twice with ether. The combined ether solutions are washed with water and then extracted with dilute acetic acid. The acetic acid solution of the basic reaction products is made alkaline with concentrated ammonia and thoroughly extracted with ether. After drying the ether solutions and concentrating them, a viscous oil remains which crystallises on adding petroleum ether. After recrystallisation from benzene/petroleum ether, there is obtained 5-(γ-dimethylamino-proxyl)-5 - hydroxy - 5,6,11, 12 - tetrahydro - dibenzo[a,e]cyclooctene with a melting point of 110–112°. The hydrochloride salt prepared therefrom with ethanolic hydrochloric acid melts at 196–198°.

On using 82 g. of γ-dimethylamino-β-methyl-propyl chloride 5-(γ-dimethylamino-β-methyl-propyl)-5-hydroxy-5,6,11,12 - tetrahydro-dibenzo[a,e]cyclooctene recrystallised from petroleum ether (M.P. 124–126°) and is hydrochloride (M.P. 228–230°) are produced in an analogous manner.

EXAMPLE 2

One ml. of ethyl bromide and an iodine crystal are added to 4.6 g. of magnesium in 80 ml. of anhydrous ether, whereupon the reaction begins immediately. 30 g. of γ-chloropropyl piperidine (produced according to A. Marxer, Helv. Chim. Acta 24, 215E (1941)) are added drop by drop to this reaction solution whereupon a thick, pulpy mass gradually separates out. When the reaction subsides, another milliliter of ethyl bromide is added and the reaction mixture is then refluxed for 150 minutes. 13.2 g. of 11,12-dihydro-dibenzo[a,e]cycloocten-5(6H)-one in 260 ml. of anhydrous ether are then added drop by drop, whereupon the thick, pulpy mass gradually disappears. The whole is then refluxed for about 15 hours and after cooling the product is worked up analogously to Example 1.

5-(γ-piperidino-propyl)-5-hydroxy-5,6,11,12 - tetrahydrodibenzo[a,e]cyclooctene is obtained as colourless crystals; M.P. 87–88° (from petroleum ether). The hydrochloride prepared with ethanolic hydrochloric acid melts at 240–242° (from ethanol).

In an analogous manner, in using 30 g. of β-[1-methyl-piperidyl-(2)]-ethyl chloride, 5-{β-[1′-methyl - piperidyl-(2′)]-ethyl}-5-hydroxy - 5,6,11,12 - tetrahydro - dibenzo[a,e]cyclooctene is obtained, the hydrochloride of which melts at 190–192°.

EXAMPLE 3

31 g. of the base produced according to Example 1 are refluxed for 3 hours in a mixture of 100 ml. of concentrated hydrochloric acid and 400 ml. of glacial acetic acid. The mixture of solvents is then distilled off in vacuo, water is added to the residue and this is made alkaline with concentrated ammonia. The basic reaction products which separate are taken up in ether, the ether solution is dried and the ether is distilled off. A yellowish oil remains. On distilling, 5-(γ-dimethylamino-propyl)-11,12-dihydro-dibenzol[a,e]cyclooctene is obtained; $B.P._{0.0009}$ 149–153°, $n_D^{35}$ 1.5632.

The hydrochloride prepared in ethanol with ethanolic hydrochloric acid crystallises from acetone into colourless prisms which melt at 108–110°. After drying the hydrochloride salt thoroughly it melts at 164–166°.

On analogously treating the other hydroxyl compounds produced according to Examples 1 and 2, 5-(γ-dimethylamino-β-methyl-propyl)-11,12 - dihydro-dibenzo[a,e]cyclooctene hydrochloride (M.P. 170–172°) as well as 5-[1′-methyl-piperidyl-(2′)-ethyl - 11,12 - dihydro-dibenzo[a,e]cyclooctene (M.P. 180–182°) and the 5-(γ-piperidino-propyl)-11,12-dihydro-dibenzo[a,e]cyclooctene, the hydrochloride of which melts at 109–111°, are obtained.

EXAMPLE 4

The base liberated from 16.5 g. of the hydrochloride obtained according to Example 3 is dissolved in 150 ml. of anhydrous benzene and the solution as added drop by drop within about 30 minutes to 25 g. of chloroformic acid ethyl ester. The reaction is slightly exothermic and methyl chloride is developed. When the reaction has terminated, the reaction mixture is refluxed for 18 hours. It is then cooled and water is added. The organic phase is separated and the basic reaction products are removed by extracting twice with 50 ml. of aqueous 2 N hydrochloric acid each time. The hydrochloric acid extracts are dried and concentrated. The residue which consists of crude N-carboethoxy compound is dissolved in 140 ml. of ethylene glycol and, after adding 20 ml. of aqueous 50% potassium hydroxide solution, is kept for 18 hours at about 145° while stirring strongly. After cooling, the reaction mixture is poured into a large amount of water. The oil which separates is extracted with ether and the ether solution is washed twice with water. The basic reaction products are obtained from the ether solution by extracting three times with 100 ml. of aqueous 2 N acetic acid each time. The acid extracts are made alkaline and the oil which separates is extracted with ether. The ether solution is washed with water, dried and the solvent is evaporated. The residue is distilled under high vacuum whereupon 5(γ-methylamino-propyl)-11,12 - dihydro-dibenzo[a,e]cyclooctene is obtained. ($B.P._{0.009}$=140–142°); the hydrochloride melts at 183–185°.

In an analogous manner, 5-(γ-methylamino-β-methyl-propyl)-11,12 - dihydro-dibenzo[a,e]cyclooctene, $B.P._{0.04}$ 146–148°, the hydrochloride melts at 157–159°, is obtained from 5-(γ-dimethylamino-β-methyl-propyl)-11,12,-dihydro-dibenzo[a,e]cyclooctene.

EXAMPLE 5

To the refluxing mixture of 19.5 g. zinc granules, a trace of iodine and 1 ml. ethylbromide in 1 liter of ether benzene (volume ratio 1:1), there is added drop by drop over a period of 12 hours a solution of 44.5 g. of 11,12-dihydro dibenzo[a,e]cycloocten-5(6H)-one and 55 g. of ethyl-bromoacetate in 200 ml. of ether. Subsequently, refluxing is continued for another 12 hours. The reaction mixture is worked up by addition of 500 ml. of aqueous 20%-sulfuric acid, separation of the organic layer and washing it neutral. After removal of the solvent in vacuo, the remaining ester is hydrolyzed with 22 g. of sodium hydroxide in 200 ml. of water and 300 ml. of ethanol. Removal of most of the ethanol in vacuo leaves an essentially aqueous, alkaline solution which is extracted with chloroform to remove non-acids. The remaining aqueous phase is acidified with aqueous hydrochloric acid, causing 5-carboxymethyl-11,12,-dihydro - dibenzo[a,e]cyclooct-5-ene to precipitate.

15 g. of the crude, dried acid are dissolved in 350 ml. of ether, and an excess of a diethylether/dimethylamine mixture is added, causing the ammonium salt to precipitate.

This is filtered off, dried, and heated under nitrogen to 180–200° C. for 15 hours. The vitreous mass obtained after cooling is broken up under aqueous 2 N-sodium hydroxide solution, the resulting suspension extracted with chloroform, the chloroform extract dried over magnesium sulfate and then evaporated to dryness. The residual N,N-dimethyl-11,12-dihydro-dibenzo[a,e]-cyclooct-5-enyl-(5)-acetamide is dissolved in 75 ml. of anhydrous tetrahydrofuran and this solution is added at room temperature to a suspension of 1.2 g. of lithium aluminum hydride in 100 ml. of anhydrous tetrahydrofuran. After refluxing the mixture for 2 hours and subsequent cooling to room temperature, 1.2 ml. of water, 1.2 ml. of aqueous 15%-sodium hydroxide solution and 3.6 ml. of water are added, in that order. The resulting slurry is filtered, the filtrate evaporated to dryness and the residue taken up in 2 N-hydrochloric acid. The acid aqueous phase is extracted with benzene, then basified with ammonia, and again extracted with benzene. After drying over potassium carbonate, the benzene extraction evaporated to dryness, leaving 5-(2′-dimethylaminoethyl)-11,12-dihydro-dibenzo

[a,e]cycloct-5-ene, which is converted to its hydrochloride by means of a solution of hydrogen chloride in diethyl ether.

In an analogous manner, there are obtained using the equivalent amount of diethylamine under otherwise identical conditions, 5-(2'-diethylaminoethyl)-11,12-dihydro-dibenzo[a,e]cycloct-5-ene and its hydrochloride salt.

EXAMPLE 6

To a solution of 22 g. of 11,12-dihydro-dibenzo[a,e]cycloocten-5-(6H)-one in 300 ml. of glacial acetic acid, there are added 8 g. of diethyl amine and 3.5 g. of paraformaldehyde, and the whole is refluxed for 8 hours. Then the mixture is evaporated in vacuo to near dryness, the residue is dissolved in a minimal amount of 2 N hydrochloric acid, the solution filtered, the filtrate alkalized with ammonia and extracted with ether. The ether extract is concentrated to dryness and the residue (about 26 g.) dissolved in 100 ml. of methanol. This solution is added to 3.7 g. of sodium borohydride in 200 ml. of 50%-methanol/water at such a rate that the temperature of the reaction mixture does not exceed 30° C. After the addition has been completed, the mixture is heated to 45° C. and then evaporated in vacuo. The residue consisting of 6-diethylaminomethyl-5-hydroxy - 5,6,11,12 - tetrahydro-dibenzo[a,e]cyclooctene is refluxed for 2 hours in a mixture of 400 ml. of glacial acetic acid and 100 ml. of conc. hydrochloric acid. After evaporation to dryness, the residue is taken up in 2 N-sodium hydroxide solution and extracted with ether. After drying of the ether solution, dry hydrogen chloride is introduced into the solution, causing precipitation of the hydrochloride of 5-diethylaminomethyl-11,12-dihydro-dibenzo[a,e]cyclooctene.

In an analogous manner there are obtained, using an equivalent amount of dimethylamine, 5-dimethylaminomethyl-11,12-dihydro-dibenzo[a,e]cyclooctene and its hydrochloride salt.

We claim:
1. A compound of the formula

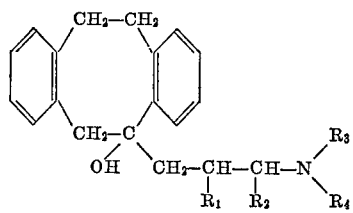

or a pharmaceutically acceptable salt thereof, in which formula
each of $R_1$ and $R_2$ is a member selected from the group consisting of hydrogen and lower alkyl,
$R_3$ is selected from the group consisting of hydrogen, lower alkyl and benzyl, and
$R_4$ represents lower alkyl.

2. A compound of the formula

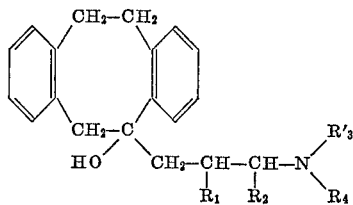

wherein each of $R_1$ and $R_2$ is a member selected from the group consisting of hydrogen and lower alkyl, $R'_3$ is benzyl and $R_4$ is lower alkyl.

References Cited

UNITED STATES PATENTS 3,317,543   5/1967   Humber _____ 260—290

ROBERT V. HINES, *Primary Examiner.*

U.S. Cl. X.R.

260—239, 244, 247, 247.7, 268, 269, 293, 294.7, 326.5, 326.81, 333, 469, 471, 482, 501.1, 501.21, 515, 544, 558, 562, 570.9, 583, 590; 424—244, 248, 267, 274, 330